(12) United States Patent
Take et al.

(10) Patent No.: US 12,529,841 B2
(45) Date of Patent: Jan. 20, 2026

(54) ELECTRO-OPTIC DEVICE

(71) Applicant: TDK CORPORATION, Tokyo (JP)

(72) Inventors: Hiroshi Take, Hong Kong (CN); Kenji Nagase, Hong Kong (CN); Anthony Reymund Melad Binarao, Hong Kong (CN); Cheng Bu Heng, Hong Kong (CN)

(73) Assignee: TDK CORPORATION, Tokyo (JP)

( * ) Notice: Subject to any disclaimer, the term of this patent is extended or adjusted under 35 U.S.C. 154(b) by 267 days.

(21) Appl. No.: 18/028,354

(22) PCT Filed: Sep. 29, 2021

(86) PCT No.: PCT/JP2021/035755
§ 371 (c)(1),
(2) Date: Mar. 24, 2023

(87) PCT Pub. No.: WO2022/071357
PCT Pub. Date: Apr. 7, 2022

(65) Prior Publication Data
US 2023/0375781 A1 Nov. 23, 2023

(30) Foreign Application Priority Data
Sep. 29, 2020 (CN) .......................... 202011049946.9

(51) Int. Cl.
*G02B 6/12* (2006.01)
(52) U.S. Cl.
CPC ................. *G02B 6/12007* (2013.01); *G02B 2006/12097* (2013.01)

(58) Field of Classification Search
CPC .................. G02B 6/12007; G02B 2006/12097
See application file for complete search history.

(56) References Cited

U.S. PATENT DOCUMENTS

| 7,627,200 B2* | 12/2009 | Shiraishi ............... G02F 1/0356 385/40 |
| 11,366,344 B2* | 6/2022 | Iwatsuka ................. G02F 1/011 |
| 2007/0280580 A1* | 12/2007 | Shiraishi ............... G02F 1/0356 385/8 |
| 2009/0108377 A1* | 4/2009 | Chen ................. H01L 21/02255 257/E21.24 |

(Continued)

FOREIGN PATENT DOCUMENTS

| JP | 2006195383 A | * | 7/2006 |
| JP | 2007199500 A | * | 8/2007 |

(Continued)

OTHER PUBLICATIONS

English translation of JP-2015014716-A (Year: 2015).*

(Continued)

*Primary Examiner* — Peter Radkowski
(74) *Attorney, Agent, or Firm* — Oliff PLC

(57) ABSTRACT

An electro-optic device which is provided with: a substrate, an optical waveguide formed on the substrate, and an upper electrode formed on the optical waveguide. The electro-optic device is further provided with a buffer layer formed between the substrate and the upper electrode, and a boundary portion of the optical waveguide and the buffer layer forms an oxide layer different from the optical waveguide and the buffer layer in composition.

6 Claims, 3 Drawing Sheets

(56) References Cited

U.S. PATENT DOCUMENTS

2020/0310170 A1* 10/2020 Iwatsuka ................ G02F 1/011

FOREIGN PATENT DOCUMENTS

| JP | 2007-322599 A | | 12/2007 | | |
|---|---|---|---|---|---|
| JP | 2015014716 A | * | 1/2015 | | |
| WO | WO-2019069815 A1 | * | 4/2019 | .............. | G02F 1/011 |

OTHER PUBLICATIONS

Giorgi et al., Zirconium and hafnium oxide interface with silicon: Computational study of stress and strain effects, Computational Materials Science, vol. 43, Issue 4, 2008, pp. 930-937. (Year: 2008).*

Jan. 11, 2022 International Search Report issued in Patent Application No. PCT/JP2021/035755.

Jan. 11, 2022 Written Opinion of the International Searching Authority issued in Patent Application No. PCT/JP2021/035755.

* cited by examiner

[Fig. 1]
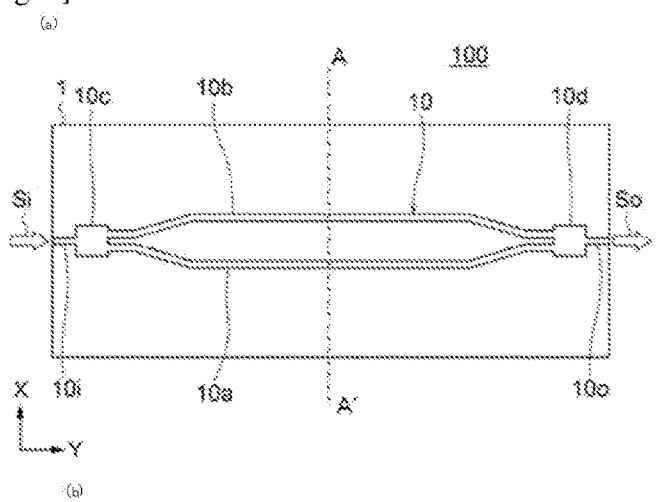
[Fig. 2]
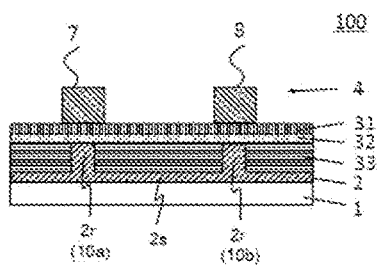
[Fig. 3]
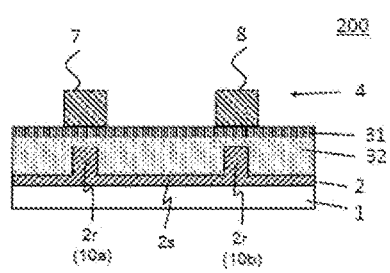

[Fig. 4]
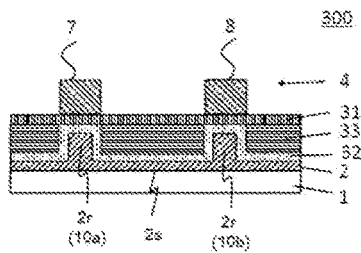
[Fig. 5]
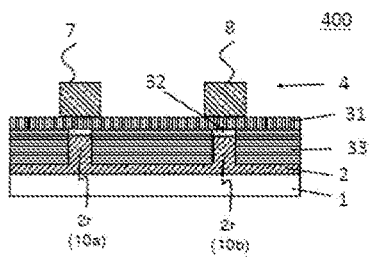
[Fig. 6]
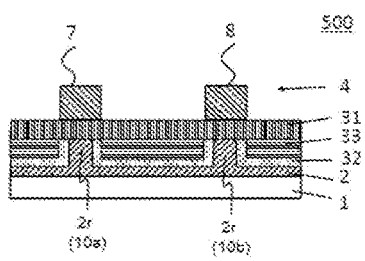
[Fig. 7]
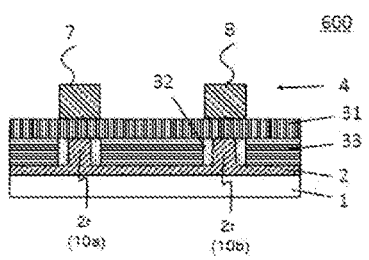
[Fig. 8]
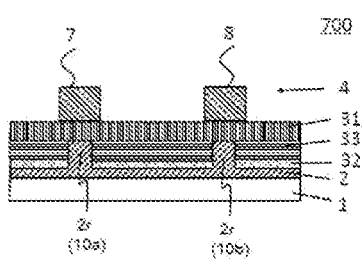

[Fig. 9]
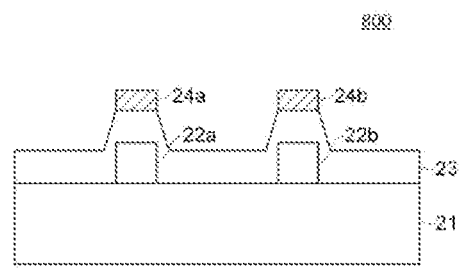

ELECTRO-OPTIC DEVICE

TECHNICAL FIELD

The present invention relates to an electro-optic device for the fields of optical communication and optical measurement.

BACKGROUND ART

With the popularization of the Internet, the communication traffic is dramatically increased, and the importance of optical fiber communication is very high. Optical fiber communication is a communication mode of converting an electric signal into an optical signal and transmitting the optical signal through an optical fiber, and has the characteristics of wide bandwidth, low loss and strong noise resistance.

As the mode of converting the electric signal into the optical signal, it is known that there are a direct modulation mode utilizing semiconductor laser and an external modulation mode using an optical modulator. Direct modulation does not require the optical modulator and is low in cost, but has the limit in the aspect of high-speed modulation, resulting in that the external optical modulation mode is used in the high-speed and long-distance application.

A Mach-Zehnder optical modulator using a lithium niobate film (LN film) is disclosed in Patent Literature 1. Compared to an optical modulator using a lithium niobate monocrystal substrate, the optical modulator using the lithium niobate film implements great miniaturization and low driving voltage. FIG. 9 shows a structure of a section of an existing optical modulator 800 disclosed in Patent Literature 1. A pair of optical waveguides 22a and 22b prepared from the lithium niobate film are formed on a sapphire substrate 21, and a signal electrode 24a and a ground electrode 24b are respectively configured at the upper portion of the optical waveguides 22a and 22b via a buffer layer 23. The optical modulator 800 is a so-called single-driven type optical modulator with one signal electrode 24a, and the signal electrode 24a and the ground electrode 24b are symmetrical structure, and thus, electric fields applied to the optical waveguides 22a and 22b are the same in size, and opposite in sign.

In Patent Literature 1, the LN film is in direct contact with the buffer layer 23, and the lithium niobate film at a boundary position of the buffer layer 23 is liable to generate the oxygen defects, resulting in deterioration of propagation loss.

CITATION LIST

Patent Literature

Literature in Prior Art

Patent Literature

Patent Literature 1: Japanese Laid-Open Patent Publication No. 2006-195383

SUMMARY OF INVENTION

The present invention is completed in view of the above-mentioned problem, and aims to provide an electro-optic device capable of providing oxygen to an LN film at a boundary position of a buffer layer so as to suppress the oxygen defects of the LN film. The electro-optic device is provided with a substrate, an optical waveguide formed on the substrate and an upper electrode formed on the optical waveguide, the electro-optic device is further provided with a buffer layer formed between the substrate and the upper electrode, and a boundary portion of the optical waveguide and the buffer layer forms an oxide layer different from the optical waveguide and the buffer layer in composition.

In addition, in the electro-optic device provided by the present invention, preferably, the optical waveguide is provided with a slab portion formed on the substrate and a ridge portion protruding from the slab portion, and the oxide layer is at least formed on the top surface of the ridge portion.

In addition, in the electro-optic device provided by the present invention, preferably, the oxide layer is further formed on the side surface of the ridge portion.

In addition, in the electro-optic device provided by the present invention, preferably, the oxide layer is further formed on the top surface of the slab portion.

In addition, in the electro-optic device provided by the present invention, preferably, the oxide layer is a single-element oxide, and is amorphous.

In addition, in the electro-optic device provided by the present invention, preferably, the molar ratio of oxygen in the oxide layer is 60% or more.

In addition, in the electro-optic device provided by the present invention, preferably, the oxide layer is an oxide of any one of Cr, Al, Si, Ti, Mn and Ta.

In addition, in the electro-optic device provided by the present invention, preferably, the buffer layer belongs to a M-Si—O type, wherein M is at least more than one of Al, Zr, Hf, La, Ba, Bai, Ti, Ca, Mo and In.

In addition, in the electro-optic device provided by the present invention, preferably, the oxide layer is only formed on the side surface of the ridge portion and the top surface of the slab portion.

In addition, in the electro-optic device provided by the present invention, preferably, the oxide layer is only formed on the side surface of the ridge portion.

In addition, in the electro-optic device provided by the present invention, preferably, the oxide layer is only formed on the top surface of the slab portion.

According to the electro-optic device provided by the present invention, the oxygen defects of the LN film at the boundary position of the buffer layer can be suppressed so as to reduce optical propagation loss.

BRIEF DESCRIPTION OF DRAWINGS

FIG. 1(a) and FIG. 1(b) are top views of an optical modulator 100 according to a first embodiment of the present invention, FIG. 1(a) merely shows an optical waveguide, and FIG. 1(b) shows the entirety of the optical modulator 100 including a traveling wave electrode.

FIG. 2 is a schematic cross sectional view of the optical modulator 100 along an AA' line in FIG. 1(a) and FIG. 1(b).

FIG. 3 is a schematic cross sectional view of an optical modulator 200 according to another embodiment of the present invention.

FIG. 4 is a schematic cross sectional view of an optical modulator 300 according to another embodiment of the present invention.

FIG. 5 is a schematic cross sectional view of an optical modulator 400 according to another embodiment of the present invention.

FIG. 6 is a schematic cross sectional view of an optical modulator 500 according to another embodiment of the present invention.

FIG. 7 is a schematic cross sectional view of an optical modulator 600 according to another embodiment of the present invention.

FIG. 8 is a schematic cross sectional view of an optical modulator 700 according to another embodiment of the present invention.

FIG. 9 is a schematic cross sectional view of an optical modulator 800 in the prior art.

DESCRIPTION OF EMBODIMENTS

The mode for implementing the present invention will be illustrated in detail below with reference to the drawings.

FIG. 1(a) and FIG. 1(b) are top views of an optical modulator (photoelectric device) 100 according to one embodiment of the present invention, FIG. 1(a) merely shows an optical waveguide, and FIG. 1(b) shows the entirety of the optical modulator 100 including a traveling wave electrode.

As shown in FIG. 1(a) and FIG. 1(b), the optical modulator 100 is provided with: a Mach-Zehnder optical waveguide 10 with first and second optical waveguides 10a and 10b formed on a substrate 1 and arranged in parallel with each other; a first electrode 7 arranged along the first optical waveguide 10a; and a second electrode 8 arranged along the second optical waveguide 10b.

The Mach-Zehnder optical waveguide 10 is an optical waveguide with a structure of a Mach-Zehnder interferometer. The Mach-Zehnder optical waveguide 10 is provided with the first and second optical waveguides 10a and 10b which are branched from one input optical waveguide 10i through a branch portion 10c, and the first and second optical waveguides 10a and 10b are merged into one output optical waveguide 10o via a multiplexing portion 10d. Input light Si is branched through the branch portion 10c, respectively travels in the first and second optical waveguides 10a and 10b, then is subjected to wave merging at the multiplexing portion 10d, and is output from an output optical waveguide 10 as modulated light So.

The first electrode 7 covers the first optical waveguide 10a when being viewed from the top, and similarly, the second electrode 8 covers the second optical waveguide 10b when being viewed from the top. In other words, the first electrode 7 is formed on the first optical waveguide 10a via a buffer layer (to be described later), and similarly, the second electrode 8 is formed on the second optical waveguide 10b via the buffer layer. The first electrode 7, for example, is connected with an Alternating Current (AC) signal, and can be called as a "jump" electrode. The second electrode, for example, is grounded, and can be called as a "ground" electrode.

An electric signal (modulation signal) is input to the first electrode 7. The first and second optical waveguides 10a and 10b are formed by a material with an electro-optic effect, such as lithium niobate and the like, and thus, by electric fields applied to the first and second optical waveguides 10a and 10b, the refractive indices of the first and second optical waveguides 10a and 10b are respectively changed with $+\Delta n$ and $-\Delta n$, and a phase difference between the pair of optical waveguides is changed. A signal light modulated by the change of the phase difference is output from the output optical waveguide 10o.

FIG. 2 is a schematic cross sectional view of the optical modulator 100 along an AA' line in FIG. 1(a) and FIG. 1(b).

As shown in FIG. 2, the optical modulator 100 according to this embodiment at least has a multi-layer structure formed by sequentially laminating the substrate 1, a waveguide layer 2, a first buffer layer 31 and an electrode layer 4. The substrate 1, for example, is a sapphire substrate, and the waveguide layer 2 composed by a lithium niobate film is formed on the surface of the substrate 1. The waveguide layer 2 is provided with the first and second optical waveguides 10a and 10b formed by a slab portion 2s and a ridge portion 2r protruding from the slab portion 2s.

In order to prevent light propagated in the first and second optical waveguides 10a and 10b from being adsorbed by the first electrode 7 or the second electrode 8, the first buffer layer 31 is at least formed on the upper surface of the ridge portion 2r of the waveguide layer 2. Therefore, the first buffer layer 31 just needs be used as an intermediate layer between the optical waveguide and a signal electrode to take effects, and the first buffer layer 31 can be widely selected as long as a material of the first buffer layer 31 is non-metal. For example, the first buffer layer 31 can use a ceramic layer prepared from an insulating material such as metal oxide, metal nitride, metal carbide and the like. The buffer layer material may be a crystalline material or an amorphous material. As a more preferred embodiment, the first buffer layer 31 can use a material of which the refractive index is smaller than that of the waveguide layer 2, e.g., $Al_2O_3$, $SiO_2$, $LaAlO_3$, LaYO3, ZnO, $HfO_2$, MgO, $Y_2O_3$ and the like.

The first electrode 7 and the second electrode 8 are arranged on a electrode layer 7. The first electrode 7 is at least opposite to the first optical waveguide 10a via the first buffer layer 31, and is set to overlap with the ridge portion 2r corresponding to the first optical waveguide 10a so as to modulate light traveling in the first optical waveguide 10a. The second electrode 8 is at least opposite to the second optical waveguide 10b via the first buffer layer 31, and is set to overlap with the ridge portion 2r corresponding to the second optical waveguide 10b so as to modulate light traveling in the second optical waveguide 10b.

There is no special limit to the waveguide layer 2 as long as the waveguide layer 2 is made of an electro-optic material, but preferably, the waveguide layer 2 is formed by lithium niobate ($LiNbO_3$). It is because that lithium niobate has a large electro-optic constant and is suitable to use as a component material of an optical device such as the optical modulator and the like. The structure of the present invention in a case that the waveguide layer 2 is a lithium niobate film will be illustrated in detail below.

As long as the refractive index of the substrate 1 is smaller than that of the lithium niobate film, there is no special limit to the substrate 1, and preferably, the substrate 1 is a substrate on which the lithium niobate film can be formed as an epitaxial film. Specifically, the substrate 1 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface.

The term "epitaxial film", as used herein, refers to a film whose crystal orientation is aligned with respect to the underlying substrate or film. When the film plane is set to the X-Y plane and the film thickness direction is set to the Z-axis, the crystals are aligned in the X-axis, Y-axis, and Z-axis directions. For example, the existence of an epitaxial film can be confirmed by first measuring the peak intensity at the orientation position by 2θ-θX-ray diffraction and then confirming poles.

Specifically, first, in the 2θ-θX-ray diffraction measurement, all the peak intensities except for the target plane must be 10% or less, preferably 5% or less, of the maximum peak intensity on the target plane. For example, in a c-axis oriented epitaxial lithium niobate film, the peak intensities except for a (00L) plane are 10% or less, preferably 5% or less, of the maximum peak intensity on the (00L) plane. (00L) is a general term for (001), (002), and other equivalent planes.

Secondly, poles must be observed in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since $LiNbO_3$ has a trigonal crystal system, single-crystal $LiNbO_3$ (014) has 3 poles. For the lithium niobate film, it is known that crystals rotated by 180° about the c-axis are epitaxially grown in a symmetrically-coupled twin crystal state. In this case, three poles are symmetrically-coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of $Li_xNb_AA_yO_z$. A denotes an element other than Li, Nb, and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or in combination.

It is desirable to form the lithium niobate film by a film forming method such as sputtering, CVD, or sol-gel process. If the c-axis of the lithium niobate film is oriented perpendicular to the main surface of the single-crystal substrate, an electric field is applied parallel to the c-axis, thereby changing the optical refractive index in proportion to the intensity of the electric field. If the single-crystal substrate is sapphire, the lithium niobate film is formed by epitaxial growth directly on the sapphire single-crystal substrate. If the single-crystal substrate is silicon, the lithium niobate film is formed by epitaxial growth on a cladding layer (not shown) formed on the substrate. The cladding layer (not shown) is made of material which has a lower refractive index than the lithium niobate film and should be suitable for epitaxial growth.

As a formation method for the lithium niobate film, there is known a method of thinly polishing or slicing the lithium niobate single crystal substrate. This method is advantageous in that the same characteristics as the single crystal can be obtained and can be applied to the present invention.

In this embodiment, a boundary portion of the waveguide layer 2 and the first buffer layer 31 forms an oxide layer 32 different from the waveguide layer 2 and the first buffer layer 31 in composition. Specifically, as shown in FIG. 2, the oxide layer 32 is formed below the first buffer layer 31, and covers the upper surface of the ridge portion 2r. In addition, a second buffer layer 33 is further formed between the ridge portions 2r and above the slab portion 2s. By forming the oxide layer 32 on the upper surface of the ridge portion 2r, oxygen in the oxide layer 32 can be provided to the LN film so as to suppress the oxygen defects in the LN film.

When being viewed from the top, the second buffer layer 33 is formed at a position where the second buffer layer 33 does not overlap with the first and second optical waveguides 10a and 10b. The second buffer layer 33 covers the whole of the region in which the ridge 2r is not formed in the upper surface of the waveguide layer 2, and the side surface of the ridge portion 2r is also covered by the second buffer layer 33, so that scattering loss generated due to the rough side surface of the ridge portion 2r can be prevented. The thickness of the second buffer layer 33 is approximately the same with the height of the ridge portion 2r of the waveguide layer 2. A material of the second buffer layer 33 is not specially defined, and for example, silicon oxide (Sift) can be used. Herein, the second buffer layer 33 and the oxide layer 32 are film layers formed in different processes. In addition, the material of the second buffer layer 33 may be the same with that of the first buffer layer 31, or may be different from that of the first buffer layer 31.

The oxide layer 32 is preferably a single-element oxide, and is amorphous. When the oxide layer 32 is amorphous, it is easier to supply oxygen from the oxide layer 32 to the LN film than in the case of crystallization.

The molar ratio of oxygen of the oxide layer 32 preferably is 60% or more. In a case that the molar ratio of oxygen is high, oxygen can be filled to the LN film in the annealing process. The oxide layer 32 may be an oxide of at least one selected from the group consisting of Cr, Al, Si, Ti, Mn and Ta. It is preferred that a metal oxide consisted of one kind of metal selected from the above identified metals is used. And the metal oxide may include the element as carbon, nitrogen, or hydrogen. Carbon is a particularly preferred element. A content amount of the element preferably is less than 5 atomic percent or equal to 5 atomic percent, more preferably 0.1 atomic percent to 3 atomic percent. A measurement of the content amount of the element can be gotten by EDS (Energy-dispersive X-ray spectroscopy).

The first buffer layer 31 may be M-Si—O type preferably, wherein M is at least one of Al, Zr, Hf, La, Ba, Bai, Ti, Ca, Mo and In.

Basically, the composition of the first buffer layer 31 is different from that of the oxide layer 32. And, preferably, the first buffer layer 31 is comprised of the composition doped a heavier metal than the metal consisted of in the oxide layer 32. For example, materials in the M-Si—O composition are preferred. In particular, when Si—O oxides are used in the oxide layer 32, the M-Si—O composition (mass number of M>mass number of Si) is more preferable for the first buffer layer 31.

And the metal oxide may include the element as carbon, nitrogen, or hydrogen. Carbon is a particularly preferred element. A content amount of the element preferably is less than 5 atomic percent or equal to 5 atomic percent, more preferably 0.1 atomic percent to 3 atomic percent. A measurement of the content amount of the element can be gotten by EDS (Energy-dispersive X-ray spectroscopy.

In addition, the higher the film density of the oxide layer 32 is, the higher the oxygen composition ratio of the oxide layer 32 is. The oxide layer 32, for example, is formed by CVD film forming, sputtering film forming and the like. After the oxide layer 32 is formed, the annealing process is performed.

In the optical modulator 100, by forming the oxide layer 32 between the ridge portion 2r of the waveguide layer 2 and the first buffer layer 31, propagation loss caused by oxygen defects of the LN film at the boundary position of the buffer layer can be suppressed.

FIG. 3 is a schematic cross sectional view of an optical modulator 200 according to another embodiment of the present invention. As shown in FIG. 3, the oxide layer 32 is formed below the first buffer layer 31, and covers the upper surface of the ridge portion 2r and the slab portion 2s. In addition, the oxide layer 32 is also formed between the ridge portions 2r. In other words, the side surface of the ridge portion 2r is also covered by the oxide layer 32.

In the optical modulator 200, by forming the oxide layer 32 between the waveguide layer 2 and the first buffer layer 31, propagation loss caused by oxygen defects of an LN film at the boundary position of the buffer layer can be suppressed.

FIG. 4 is a schematic cross sectional view of an optical modulator 300 according to another embodiment of the present invention. As shown in FIG. 4, the oxide layer 32 extends along the outer surface of the waveguide layer 2. In other words, the oxide layer 32 covers the upper surface and the side surface of the ridge portion 2r and the upper surface of the slab portion 2s. The second buffer layer 33 covers the oxide layer 32, and the thickness of the second buffer layer 33 is approximately the same with the height of the uppermost surface of the oxide layer 32. The first buffer layer 31 is formed in a manner of covering the oxide layer 32 and the second buffer layer 33. Herein, the first buffer layer 31 and the second buffer layer 33 also can be formed from the same buffer layer.

In the optical modulator 300, by arranging the oxide layer 32 along a boundary of the LN film, propagation loss caused by oxygen defects of the LN film at the boundary position of the buffer layer can be suppressed.

FIG. 5 is a schematic cross sectional view of an optical modulator 400 according to another embodiment of the present invention. As shown in FIG. 5, the oxide layer 32 only covers the upper surface of the ridge portion 2r. The second buffer layer 33 is formed at the position where the second buffer layer 33 does not overlap with first and second optical waveguides 10a and 10b. The second buffer layer 33 covers the whole of the region in which the ridge 2r is not formed in the upper surface of the waveguide layer 2, and the side surface of the ridge portion 2r is also covered by the second buffer layer 33, so that scattering loss generated due to the rough side surface of the ridge portion 2r can be prevented. The thickness of the second buffer layer 33 is approximately the same with the height of the upper surface of the oxide layer 32. The first buffer layer 31 is formed in a manner of covering the oxide layer 32 and the second buffer layer 33. Herein, the first buffer layer 31 and the second buffer layer 33 also can be formed from the same buffer layer.

In the optical modulator 400, by arranging the oxide layer 32 between the first and second optical waveguides 10a and 10b and the buffer layer, propagation loss caused by oxygen defects of the LN film at the boundary position of the buffer layer can be suppressed.

FIG. 6 is a schematic cross sectional view of an optical modulator 500 according to another embodiment of the present invention. The difference between the optical modulator 500 shown in FIG. 6 and the optical modulator 300 shown in FIG. 4 is only that the oxide layer 32 does not cover the upper surface of the ridge portion 2r. In the optical modulator 500, by arranging the oxide layer 32 on the upper surface of the slab portion 2s of the waveguide layer 2 and on the side surface of the ridge portion 2r of the waveguide layer 2, propagation loss caused by oxygen defects of the LN film at the boundary position of the buffer layer can be suppressed.

FIG. 7 is a schematic cross sectional view of an optical modulator 600 according to another embodiment of the present invention. The difference between the optical modulator 600 shown in FIG. 7 and the optical modulator 500 shown in FIG. 6 is only that the oxide layer 32 only covers the side surface of the ridge portion 2r. In the optical modulator 500, by arranging the oxide layer 32 on the side surface of the ridge portion 2r of the waveguide layer 2, propagation loss caused by oxygen defects of the LN film at the boundary position of the buffer layer can be suppressed.

FIG. 8 is a schematic cross sectional view of an optical modulator 700 according to another embodiment of the present invention. The difference between the optical modulator 700 shown in FIG. 8 and the optical modulator 500 shown in FIG. 6 is only that the oxide layer 32 only covers the upper surface of the slab portion 2s. In the optical modulator 700, by arranging the oxide layer 32 on the upper surface of the slab portion 2s of the waveguide layer 2, propagation loss caused by oxygen defects of the LN film at the boundary position of the buffer layer can be suppressed.

EXAMPLES

Electro-optic devices 100 with the cross-sectional structure shown in FIG. 2 are used as examples, while electro-optic devices, in which an oxide layer 32 is not formed, are used as comparative examples. Transmission attenuation of light in the examples and the comparative examples are compared.

Example 1

In Example 1, a $SiO_2$ layer 32 with the thickness of 50 nm is formed on a second buffer portion 33 and a ridge portion 2r by CVD film forming, and the Sift layer 32 is amorphous. In Comparative Example 1, the structures are the same as those in Example 1, except that SiO2 layer 32 is not formed. An evaluation result of Example 1 is as shown in Table 1.

TABLE 1

| | Actually Measured Values (dB/cm)) | | | | Number below standard of 0.5 dB/cm | Yield Rate |
|---|---|---|---|---|---|---|
| Comparative Example 1 | 0.39 | 0.53 | 0.59 | 0.74 | 7 | 58% |
| | 0.43 | 0.54 | 0.62 | 0.79 | | |
| | 0.53 | 0.54 | 0.65 | 0.81 | | |
| Example 1 | 0.23 | 0.39 | 0.41 | 0.49 | 11 | 92% |
| | 0.23 | 0.40 | 0.42 | 0.43 | | |
| | 0.33 | 0.40 | 0.43 | 0.62 | | |

It can be seen from Table 1 that by forming a $SiO_2$ oxide film with the thickness of 50 nm on the second buffer portion 33 and the ridge portion 2r, transmission loss of light can be reduced, and the yield rate can be improved.

Example 2

In Example 2, a $SiO_2$ layer 32 with the thickness of 100 nm is formed on a second buffer portion 33 and a ridge portion 2r by CVD film forming, and the $SiO_2$ layer 32 is amorphous. In Comparative Example 2, the structures are the same as those in Example 2, except that $SiO_2$ layer 32 is not formed. An evaluation result of Example 2 is as shown in Table 2.

TABLE 2

|  | Actually Measured Values (dB/cm) | | | | Number below standard of 0.5 dB/cm | Yield Rate |
|---|---|---|---|---|---|---|
| Comparison Example 2 | 0.30 | 0.48 | 0.54 | 0.64 | 8 | 67% |
|  | 0.32 | 0.48 | 0.55 | 0.74 |  |  |
|  | 0.40 | 0.53 | 0.63 | 0.79 |  |  |
| Example 2 | 0.23 | 0.37 | 0.40 | 0.56 | 11 | 83% |
|  | 0.25 | 0.37 | 0.42 | 0.60 |  |  |
|  | 0.36 | 0.40 | 0.42 | 0.63 |  |  |

It can be seen from Table 2 that by forming a $SiO_2$ oxide film with the thickness of 100 nm on the second buffer portion 33 and the ridge portion 2r, transmission loss of light can be reduced, and the yield rate can be improved.

Example 3

In Example 3, an $Al_2O_3$ layer 32 with the thickness of 50 nm is formed on a second buffer portion 33 and a ridge portion 2r by sputtering film forming, and the $Al_2O_3$ layer 32 is amorphous. In Comparative Example 3, the structures are the same as those in example 3, except that only that the $Al_2O_3$ layer 32 is not formed. An evaluation result of Example 3 is as shown in Table 3.

TABLE 3

|  | Actually Measured Values (dB/cm) | | | | Number below standard of 0.5 dB/cm | Finished Product Rate |
|---|---|---|---|---|---|---|
| Comparison Example 3 | 0.30 | 0.54 | 0.56 | 0.65 | 7 | 58% |
|  | 0.48 | 0.54 | 0.62 | 0.75 |  |  |
|  | 0.52 | 0.56 | 0.65 | 0.81 |  |  |
| Example 3 | 0.23 | 0.41 | 0.41 | 0.57 | 10 | 83% |
|  | 0.38 | 0.41 | 0.49 | 0.60 |  |  |
|  | 0.40 | 0.42 | 0.56 | 0.62 |  |  |

It can be seen from Table 3 that by forming an $Al_2O_3$ oxide film with the thickness of 50 nm on the second buffer portion 33 and the ridge portion 2r, transmission loss of light can be reduced, and the finished product rate can be improved.

Although the present invention has been specifically described above in conjunction with the drawings and embodiments, it can be understood that the above description does not limit the present invention in any form. For example, in the above description of the optical modulator 100, the first electrode is used as a signal electrode and the second electrode is used as a ground electrode. However, it is not limited to this, and the first and second electrodes may be any electrodes that apply an electric field to the optical waveguide. Those skilled in the art can make modifications and changes to the present invention as needed without departing from the essential spirit and scope of the present invention, and these modifications and changes fall within the scope of the present invention.

REFERENCE NUMERAL

1—substrate
2—waveguide layer
31—first buffer layer
32—oxide layer
33—second buffer layer
4—electrode layer
7—first electrode
8—second electrode
10—Mach-Zehnder optical waveguide
10a—first optical waveguide
10b—second optical waveguide
10c—branch portion
10d—multiplexing portion
10i—input optical waveguide
10o—output optical waveguide

The invention claimed is:

1. An electro-optic device, comprising:
a substrate, an optical waveguide formed on the substrate, and an upper electrode formed on the optical waveguide,
the electro-optic device further comprising a buffer layer formed between the substrate and the upper electrode, and
a boundary portion of the optical waveguide and the buffer layer forming an oxide layer different from the optical waveguide and the buffer layer in composition,
wherein the oxide layer is a single-element oxide, and is amorphous, and
wherein the buffer layer is a M-Si—O type, wherein M is at least one of Al, Zr, Hf, La, Ba, Bai, Ti, Ca, Mo and In.

2. The electro-optic device according to claim 1, wherein, the optical waveguide comprises a slab portion formed on the substrate and a ridge portion protruding from the slab portion, and
the oxide layer is at least formed on the top surface of the ridge portion.

3. The electro-optic device according to claim 2, wherein, the oxide layer is further formed on the side surface of the ridge portion.

4. The electro-optic device according to claim 2, wherein, the oxide layer is further formed on the top surface of the slab portion.

5. The electro-optic device according to claim 1, wherein, the molar ratio of oxygen in the oxide layer is 60% or more.

6. The electro-optic device according to claim 1, wherein, the oxide layer is an oxide of any one of Cr, Al, Si, Ti, Mn and Ta.

* * * * *